Aug. 7, 1928.
H. J. MULLER
1,679,536
EDUCATIONAL APPLIANCE
Filed Sept. 1, 1927
2 Sheets-Sheet 1
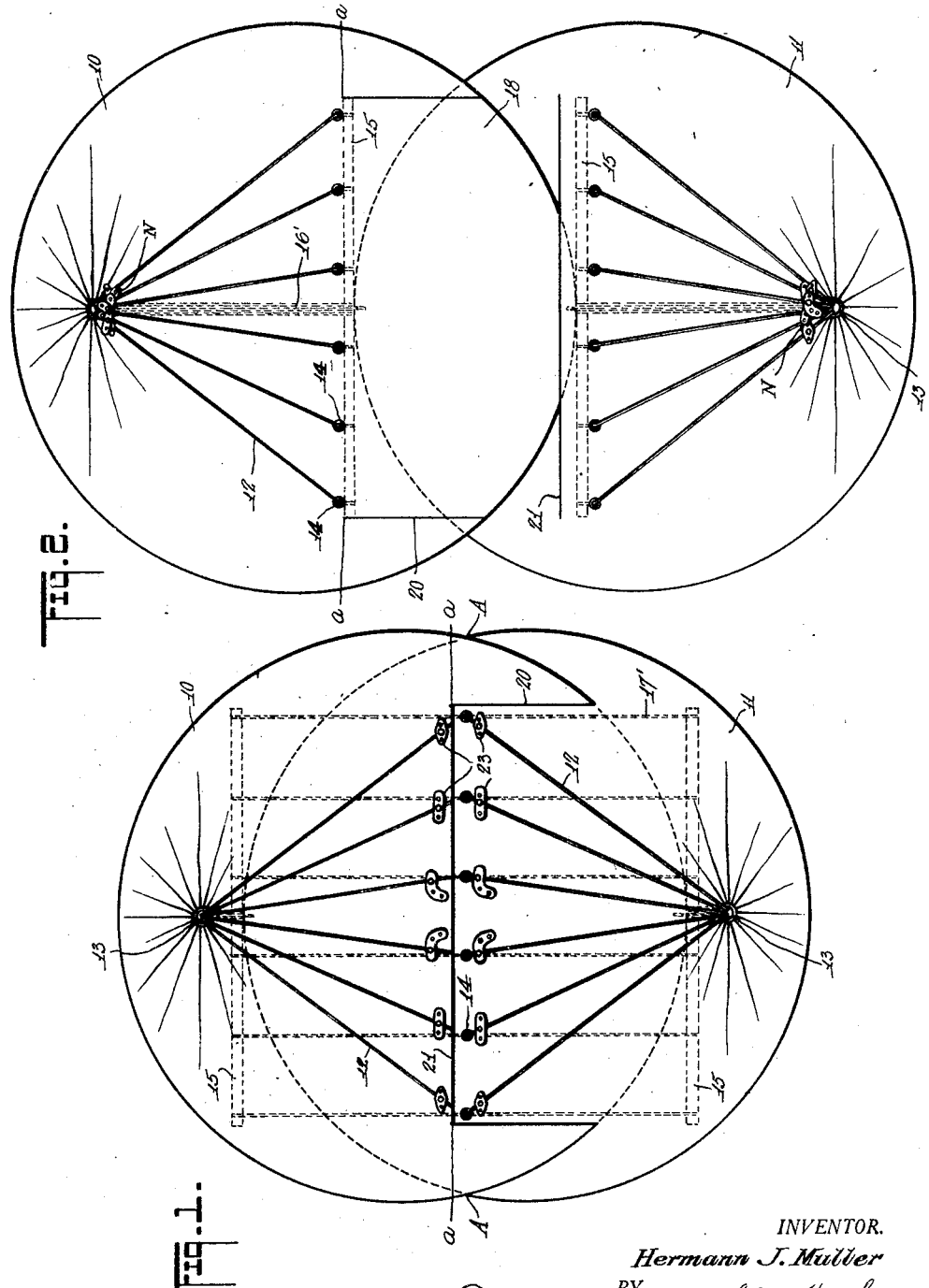
INVENTOR.
Hermann J. Muller
BY
Dean, Fairbanks, Obright & Hiroshi
his ATTORNEYS.

Aug. 7, 1928.  
H. J. MULLER  
1,679,530
EDUCATIONAL APPLIANCE
Filed Sept. 1, 1927  2 Sheets-Sheet 2
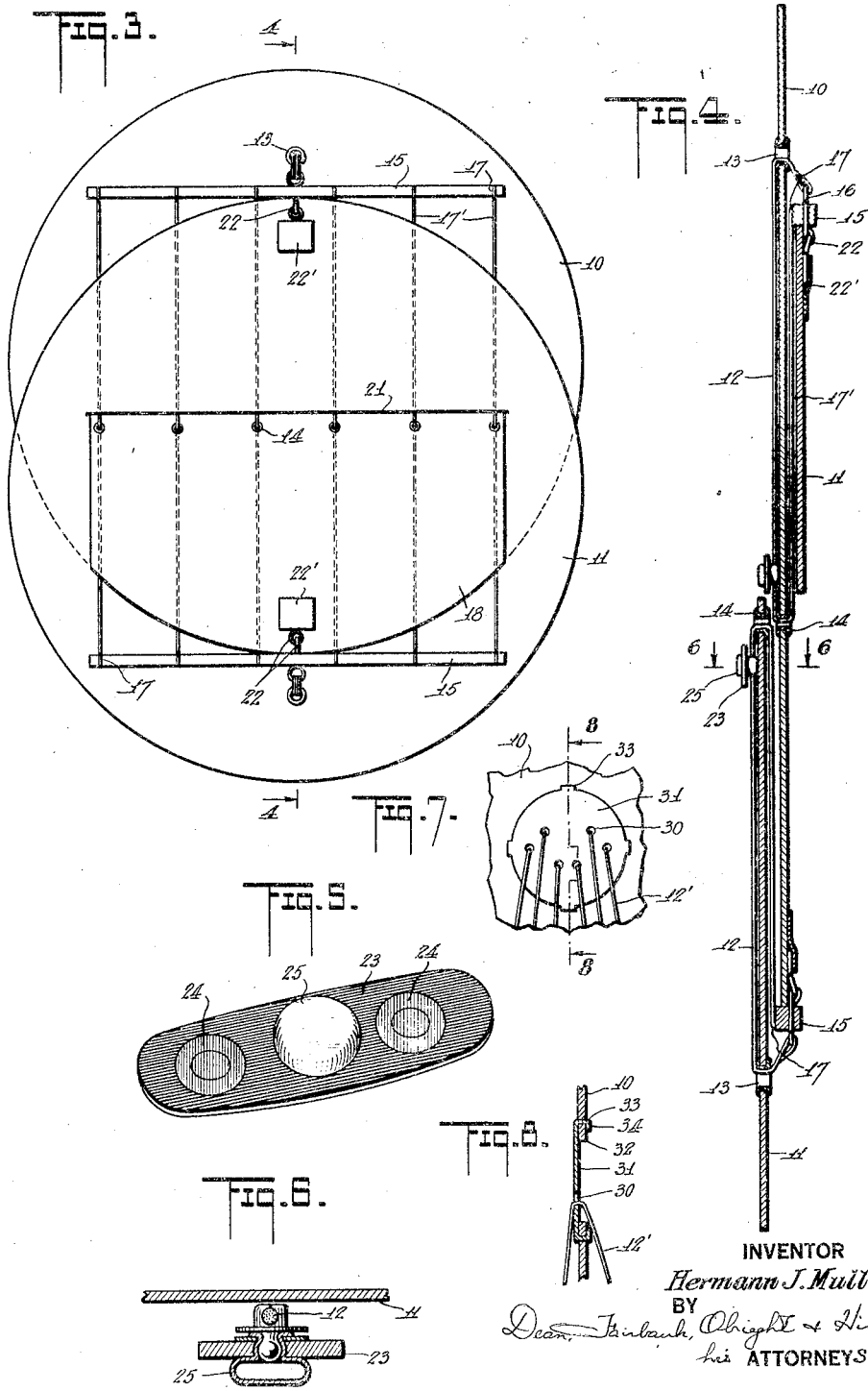
INVENTOR  
Hermann J. Muller  
BY  
Dean, Fairbank, Obright & Hirsch  
his ATTORNEYS.

Patented Aug. 7, 1928.

1,679,536

UNITED STATES PATENT OFFICE.

HERMANN J. MULLER, OF AUSTIN, TEXAS.

EDUCATIONAL APPLIANCE.

Application filed September 1, 1927. Serial No. 216,818.

My present invention relates primarily to educational devices and is shown in a specific illustrative embodiment for demonstrating the processes governing heredity and cell-division.

It is an object of the invention to provide a simple, inexpensive device of the above type, which can be easily set and conveniently actuated without the exercise of skill or training, to clearly illustrate or exemplify processes of heredity and cell-division heretofore comprehended with difficulty by the average biology student.

In the accompanying drawings in which is shown one of various possible embodiments of the several features of the invention, Fig. 1 is a plan view of the device showing the disks spread apart, Fig. 2 is a view similar to Fig. 1, showing the disks drawn together, Fig. 3 is a rear plan view of the device, Fig. 4 is a transverse section taken on line 4—4 of Fig. 3, Fig. 5 is a perspective view on a larger scale showing one of the chromosomes, Fig. 6 is a sectional detail on a larger scale taken along line 6—6 of Fig. 4, Fig. 7 is a fragmentary detail of a modified focal structure, Fig. 8 is a sectional detail taken on line 8—8 of Fig. 7.

In the drawings are shown a pair of disks 10 and 11 of cardboard, celluloid or the like, representing a pair of cells. Each of these disks has associated therewith a plurality of filaments or cords 12 representing the spindle fibers. For the specific purpose of the present application, all of the cords, illustratively six in number, of each disk, extend through a common focal part, in this embodiment, an eyelet 13 therein near the periphery of the disk. The cords 12 radiate from the focal eyelet 13 to holes or eyelets 14 aligned along a chord symmetrical with respect to the focal eyelet.

Both extremities of each of the cords are attached to a common movable anchoring or operating member, illustratively a bar or stick 15 at the back of the disk. As shown, the extremities of the cords through the focal eyelet 13 extend parallel as at 16′ along the back of the disk and are secured at an eye 16 at the middle of the bar 15, while the outer or radiating ends of the cords extend parallel as at 17′ along the back of the disk and are attached as at 17 at corresponding intervals along the length of the anchor bar 15.

The two disks are of substantially identical construction, as shown, except that one of said disks has a wide tongue 18 extending from the chord a—a and determined by a pair of parallel slits 20 in the disk, said tongue fitting into a corresponding slit 21 in the other disk. Slit 21 is closed at both ends, that is, it terminates between the ends of the corresponding chord. The two disks are associated with each other by securing the limb of each as by means of a hook and eye construction 22 to the companion disk. A backing disk 22′ affixes the hook to the disk.

For illustrating the process of heredity, I preferably provide a group of small blanks 23 of stiff paper, cardboard, celluloid or the like, suitably colored and diversely shaped to represent chromosomes of the different kinds and having suitable spots or markings 24 thereon to represent the genes which determine the hereditary characteristics. Each of these elements 23 preferably has a detachable fastener, such as a snap fastener element 25 by which it may be releasably attached to a complementary fastener element 26 on the filament.

To illustrate the operation of cell-division, chromosome pieces 23 will be selected to represent the characteristics of the parent cell, each set of these elements being affixed by its snap fastener 25 to the fastener 26 on the filament 12, representing an associated spindle fiber.

The disks being brought to the position shown in Fig. 1, which can be readily effected by grasping the two anchoring bars 15 at the backs of the disks and drawing said bars apart, the exposed lengths of the filaments will be aligned as shown in Fig. 1, along the median line or axis a—a of the cell, that is about to divide. The chromosomes 23 appear in pairs, illustratively six pairs, the two members of each pair representing identical halves of one original chromosome. When the disks 10 and 11 are drawn apart to the utmost, as shown in Fig. 2, each of the chromosomes will be seen to become grouped, in the single mass or nucleus M adjacent the centrosome or focus, illustrating the completion of cell-division. In this operation, the chromosome elements will move as riders with the filaments toward the focal eyelets 13 representing the centrosomes, each group forming the nucleus N of an offspring cell and having some of the chromosomes 23 and the corresponding genes 24 of each of the parent cells. As the cells draw apart, the furrows A deepen as in nature, until the cells are entirely separated.

It will be obvious that by appropriate selection and grouping, various hereditary processes may be illustrated, including that of reduction karyokinesis.

In Figs. 7 and 8, the focal part is embodied as a cluster of apertures, one for each spindle fiber. The apertures 30 are stamped in a sheet metal washer 31 in front of a hole 32 in the disk. The metal washer has tongues 33 clenched over the material of the disk as at 34. Thus, each filament or spindle fiber 12′ has its distinct passage near the focus, obviating the need for waxed or silk filaments which would be required in the other embodiment, to reduce frictional interference between the filaments in rubbing over each other.

The invention is not limited in its application to classroom charts of large dimension, but can readily be embodied in small or book-size dimensions to be conveniently lodged for instance, within a pocket in the cover of a textbook on heredity. The appliance when removed from the pocket, may be manipulated by the student to exemplify the processes described in the text.

It will be understood that various mechanical details of the device shown, may be subject to modification within the scope of my invention, as claimed.

While the invention is shown in an application for illustrating the processes of heredity or cell-division, for which purpose it has its preferred utility, it will be understood that the mechanical principles disclosed, may be embodied for the demonstration of phenomena, operations or systems of totally different character.

Having thus described my invention, what I claim as new and desire to secure by Letters Patent of the United States is:—

1. A device for illustrating mechanically the processes of cell division, comprising a pair of cell members each having chromosome elements movably associated therewith and connecting means between the cell elements, operatively connected to the chromosome element to cause the latter to move relative to each other when the cell members are moved toward or away from each other.

2. A device for illustrating mechanically the processes of cell division, comprising a pair of plate members, each having elongated guides radiating from a common focus part and smaller elements representing chromosomes directed by the respective guides, and means for causing said chromosomes to be moved simultaneously toward or from the corresponding focus of radiation of said guides.

3. The combination set forth in claim 2 in which the chromosome elements are removable with respect to said guide elements.

4. A device for illustrating mechanically the processes of cell division, comprising a pair of disks, filaments on each of said disks radiating from a common focus part on the respective disks and extending each to the vicinity of the intersecting cord of the two disks, chromosome elements mounted on the respective filaments and means operable from the back of said disks to cause said chromosome elements to move toward or from the median line at will along the lengths represented by the corresponding filaments.

5. An article of the character described comprising a pair of disks, means connecting said disks to permit relative approach and limited separation thereof, smaller pieces mounted on the respective disks, and operating members for moving said pieces, said operating members being associated with the connecting means between said disks to cause independent movement of said pieces as the disks are moved toward or from each other.

6. A device of the character described comprising a pair of interfitting disks, filaments interconnecting said disks, each of said disks having a displaceable anchoring member at the rear thereof for the filaments, the anchoring member of each disk being connected to the other disk, whereby the disks can be separated by drawing them apart and can be caused to approach by drawing apart said anchoring members at the rear of the device.

7. A device of the character described, comprising a pair of plates, one having a wide tongue extending into a corresponding slit in the other, each plate having a series of filaments extending along the front thereof through holes therein, a movable anchoring bar at the rear of each plate to which are affixed both extremities of the filaments on the plate, each plate being secured to the anchoring bar of the companion plate, whereby the plates may be drawn apart by hand and may be drawn toward each other by drawing apart said anchoring bars.

8. The combination set forth in claim 7 in which smaller pieces are affixed to the respective filaments, whereby said pieces will travel along the respective plates with the movement of the filaments in the approach and separation of the plates.

9. An article of the character described, comprising a pair of disks, one of said disks having a tongue determined by a pair of slits therein and fitting into a corresponding slit having its extremities between the ends of the corresponding chord of the other disk, each of said disks having a set of filaments radiating from a common focal part in the disk and extending through aligned holes parallel to the chord of intersection of said disks, each of said disks having an anchor bar at the rear thereof to which both extremities of each of the corresponding filaments are attached, and means attaching each of the disks to the anchor bar of the other disk.

10. The combination set forth in claim 9 in which smaller pieces are attached to the respective filaments so that in the approach or separation of the disks, the smaller pieces will perform movements relative to the disks.

11. In an article of the character described, a supporting plate, a plurality of filaments extending through apertures therein, a common anchoring element at the reverse face of said disk to which the opposite extremities of all of said filaments are attached, and riders mounted on said filaments to travel lengthwise thereof as the common anchor at the rear is moved backward and forward.

12. In an article of the character described, a circular supporting plate having a plurality of eyelets aligned along one chord thereof and having a reinforce structure near the periphery, symmetrical with respect to said chord, said re-enforce structure having apertures therein equal in number to said eyelets.

13. An article of the character described, comprising a disk, a focus structure comprising a metal washer having a plurality of small apertures therein, means securing said washer over an aperture in said disk, a plurality of eyelets arranged along a chord symmetrical with respect to said focus structure, a plurality of filaments radiating from the various apertures in the focus structure to the various eyelets, and means to advance said filaments in synchronism with respect to said apertures.

Signed at New York city in the county of New York and State of New York this 29th day of August, A. D. 1927.

HERMANN J. MULLER.